(No Model.)
W. PAINTER.
TOOL FOR FORMING THE NECKS OF BOTTLES.
No. 443,728. Patented Dec. 30, 1890.
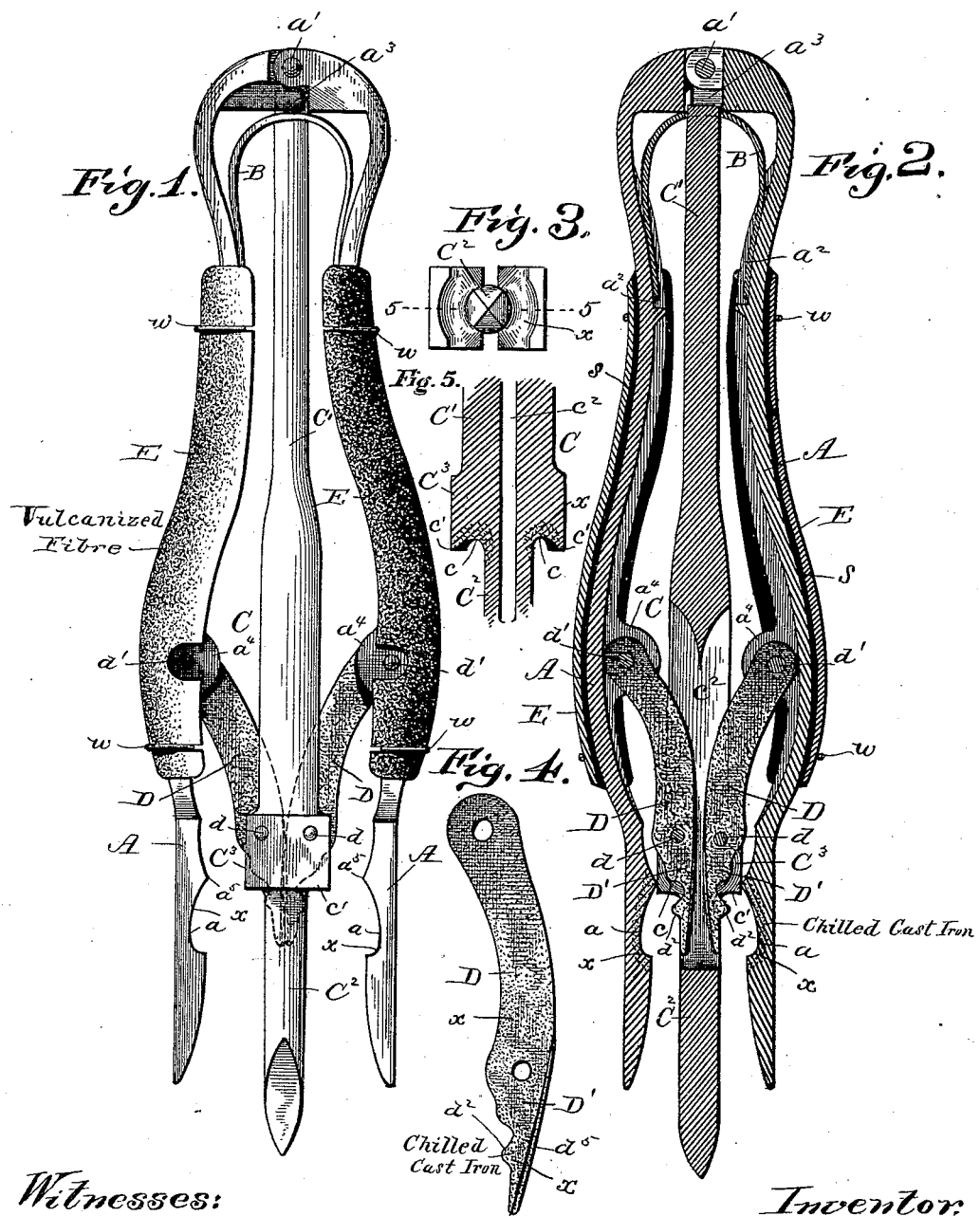
Witnesses:
J. B. McGinn.
E. K. Sturtevant.
Inventor:
William Painter,
by Smith & Low,
Attorneys.

UNITED STATES PATENT OFFICE.

WILLIAM PAINTER, OF BALTIMORE, MARYLAND, ASSIGNOR TO THE BOTTLE SEAL COMPANY, OF SAME PLACE.

TOOL FOR FORMING THE NECKS OF BOTTLES.

SPECIFICATION forming part of Letters Patent No. 443,728, dated December 30, 1890.

Application filed May 21, 1888. Serial No. 274,620. (No model.)

*To all whom it may concern:*

Be it known that I, WILLIAM PAINTER, of Baltimore, Maryland, have invented certain Improvements in Tools for Forming the Necks of Bottles, of which the following is a specification.

In the description of the said invention, which follows reference is made to the accompanying drawings, forming a part hereof, and in which—

Figure 1 is a front view of the improved tool, and Fig. 2 a sectional view of the same with the jaws closed on the core. Fig. 3 is a bottom view of the core and its boss. Fig. 4 is a view of one of the guiding and groove-forming levers detached. Fig. 5 is a vertical sectional view taken on the line 5 5, Fig. 3.

Referring to the drawings, A represents the jaws of the tool. which in the present case are two in number. Each jaw consists of a rigid casting having forming and rubbing surfaces $a$ to shape the portion of the bottle contiguous to the mouth. These jaws are pivoted together at $a'$ and have a common movement. The said jaws are yieldingly held apart by means of a spring B, which is confined within recesses $a^2$ in the said jaws. The spring is preferably perforated, and the shank $C'$ of the core C passes through it and rests within a bearing $a^3$, formed in or carried by the jaws. The portion $C^2$ of the core is adapted to enter the mouth of the bottle and act as a former for its inner side.

$C^3$ is a boss formed upon or cast with the core and hollowed or coved out at its under side at $c$, and provided at its outer edge with a downwardly-extending lip $c'$, so as to co-operate with the forming-surfaces of the jaws to properly round and smooth the lip of the bottle.

D D are guiding-levers, pivoted to the core at $d$ and to the jaws at $d'$. The core is slotted to receive the levers and the slot is denoted by $c^2$. At the point where the outer ends of the levers connect with the jaws lugs $a^4$ are formed for obvious purposes.

In order that the mouth of the bottle may be provided with an interior groove, the arms D' of the levers D are furnished with points $d^2$ of the proper configuration. When the jaws are open, the points $d^2$ are concealed within the slots $c^2$ in the core, and when the jaws are closed or brought toward the core the said points are projected outward, as shown in Fig. 2. The stops which limit the closing movement of the jaws are represented by $a^5$. It will be understood that as the jaws are closed the core is projected outward, or, in other words, the core has a motion longitudinally of the jaws.

From the foregoing description it will be seen that the points $d^2$, which form the interior groove in the bottle-mouth, offer no obstruction to the application of the tool to the bottle, as they are wholly within or do not project beyond the outer surface of the core when the jaws are extended.

I claim as my invention—

1. In a tool for forming the necks of bottles, the combination, with the jaws pivoted together and adapted to be moved toward or from each other, of the central core situated between said jaws and susceptible of a longitudinal motion relative thereto, and the guiding-levers pivoted positively one to each jaw and both to said core, whereby the relative positions of the jaws and core are rigidly maintained, substantially as specified.

2. In a tool for forming the necks of bottles, the combination, with the jaws pivoted together and adapted to be moved toward or from each other, of the central core situated between said jaws and susceptible of a longitudinal motion relative thereto, and the guiding-levers pivoted positively one to each jaw and both to the said core, whereby the relative positions of the jaws and core are rigidly maintained, said levers having forming ends extending below their pivots in said core, adapted to be projected from the latter as the jaws are closed, substantially as specified.

3. In a tool for forming the necks of bottles, the combination, with the jaws pivoted together and adapted to be moved toward or from each other, and the spring for forcing said jaws apart, of the central core situated between said jaws and having a longitudinal motion relative thereto, and the guiding-levers pivoted positively one to each jaw and both to said core, whereby the relative positions of the jaws and core are rigidly maintained, said levers having forming ends extending below their connections with said core, and the latter being slotted to permit the meeting of the said ends of the levers to form a stop to the movement of the jaws, substantially as specified.

4. In a tool for forming the necks of bottles, the combination, with the central core, of the jaws connected therewith and pivoted together at their upper ends, and a spring for forcing them apart, said jaws being cast in form and rigid and provided with shaping-surfaces at their lower ends, substantially as specified.

5. In a tool for forming the necks of bottles, the combination, with the central core and the guiding-levers pivoted thereto, of the rigid jaws pivoted together and provided with the lugs, within which the other ends of said levers are pivoted and held with the core in line with said jaws, substantially as specified.

6. In a tool for forming the necks of bottles, the combination, with the jaws having forming-surfaces upon their lower ends, of the central core connected with said jaws, and the forming-boss on said core coved out and having a downwardly-extending outer lip at the sides of the tool for operating in connection with the forming-surfaces of the jaws to round the edge of the bottle-mouth and open where the boss opposes the jaws, substantially as specified.

7. In a tool for forming the necks of bottles, the combination of the central core and the jaws hinged together and connected with the core by the levers, as described, said jaws having each a recess, the two recesses being adapted to form a guide for the upper end of the core, substantially as specified.

In testimony whereof I affix my signature in the presence of two witnesses.

WILLIAM PAINTER.

Witnesses:
V. R. ALEXANDER,
JAS. L. MURRILL.